United States Patent
Deeds et al.

(10) Patent No.: US 7,953,665 B2
(45) Date of Patent: May 31, 2011

(54) METHOD AND SYSTEM FOR DELIVERING CONTENT TO AND LOCKING CONTENT IN A USER DEVICE

(75) Inventors: Douglas Deeds, Fort Worth, TX (US); Demetrios Boutsikakis, Dallas, TX (US); Andrew Wilken, Bedford, TX (US)

(73) Assignee: Nokia Corporation, Espoo (FI)

( * ) Notice: Subject to any disclaimer, the term of this patent is extended or adjusted under 35 U.S.C. 154(b) by 631 days.

(21) Appl. No.: 10/029,159

(22) Filed: Dec. 21, 2001

(65) Prior Publication Data
US 2003/0120500 A1 Jun. 26, 2003

(51) Int. Cl.
*G06Q 99/00* (2006.01)
(52) U.S. Cl. ............. 705/51; 705/14.1; 705/52; 705/59; 726/26; 726/27; 726/28; 380/200; 380/201; 380/202
(58) Field of Classification Search .............. 705/51–59; 726/26–33; 380/200–203
See application file for complete search history.

(56) References Cited

U.S. PATENT DOCUMENTS

| | | | | |
|---|---|---|---|---|
| 4,471,163 A * | 9/1984 | Donald et al. | .................. | 705/55 |
| 5,933,497 A * | 8/1999 | Beetcher et al. | ................ | 705/59 |
| 6,460,023 B1 * | 10/2002 | Bean et al. | ........................ | 705/54 |
| 6,470,447 B1 * | 10/2002 | Lambert et al. | ................ | 713/151 |
| 6,529,905 B1 * | 3/2003 | Bray et al. | ........................ | 707/8 |
| 2002/0010698 A1 * | 1/2002 | Shin et al. | ........................ | 707/10 |
| 2002/0049679 A1 * | 4/2002 | Russell et al. | .................. | 705/52 |
| 2002/0077988 A1 * | 6/2002 | Sasaki et al. | ................... | 705/59 |
| 2002/0082910 A1 * | 6/2002 | Kontogouris | ................... | 705/14 |
| 2003/0014630 A1 * | 1/2003 | Spencer et al. | ............... | 713/168 |
| 2004/0123135 A1 * | 6/2004 | Goddard | ........................ | 713/200 |
| 2007/0162398 A1 * | 7/2007 | Tadayon et al. | .................. | 705/54 |

OTHER PUBLICATIONS

CDs Provided Infrastructure for DVD Manufacturing But a Multi-Format World Means Complications, BPI Communications, Inc., 2 pages.*

* cited by examiner

*Primary Examiner* — Jalatee Worjloh
(74) *Attorney, Agent, or Firm* — Alston & Bird LLP

(57) ABSTRACT

A method for delivering content to be locked in a user device is provided. The method includes receiving a content selection. A device identifier that is operable to identify a specified user device is received. A lock message is generated based on the content selection. The lock message is sent to the user device identified by the device identifier.

20 Claims, 3 Drawing Sheets

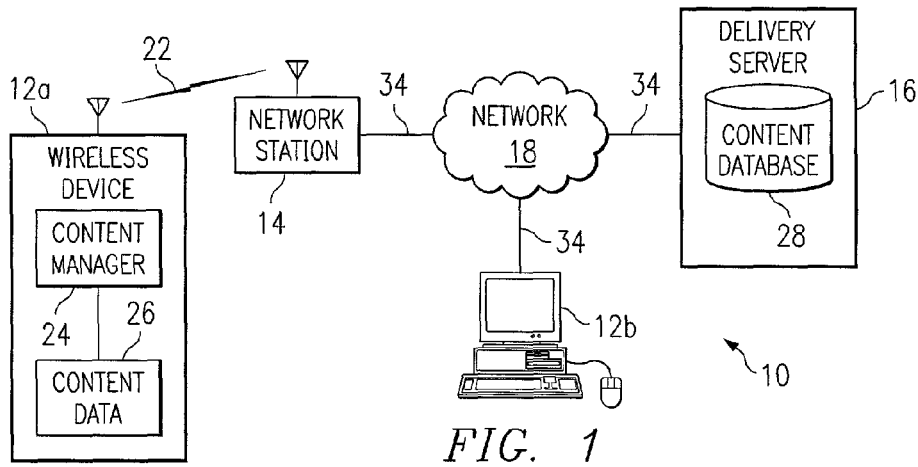
FIG. 1
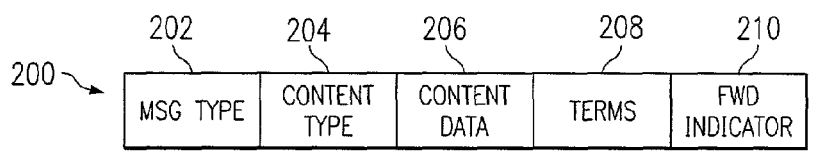
FIG. 2
| PROFILE ID | TUNE/VIBRATE | TUNE ID | VOLUME |
|---|---|---|---|
| STANDARD | TUNE | 4 | 5 |
| OUTDOOR | TUNE | 2 | 9 |
| ⋮ | | | |
| MEETING | VIBRATE | N/A | N/A |
| PROFILE ID | TUNE/VIBRATE | TUNE ID | VOLUME |
|---|---|---|---|
| STANDARD | TUNE | L | 5 |
| OUTDOOR | TUNE | L | 9 |
| ⋮ | | | |
| MEETING | VIBRATE | N/A | N/A |
FIG. 3A
| CALLER ID | TUNE ID | VOLUME |
|---|---|---|
| NICK | 3 | 6 |
| MOM | 7 | N/A |
| ⋮ | | |
| JULIE | 4 | 4 |
| CALLER ID | TUNE ID | VOLUME |
|---|---|---|
| NICK | L | 6 |
| MOM | L | N/A |
| ⋮ | | |
| JULIE | L | 4 |
FIG. 3B

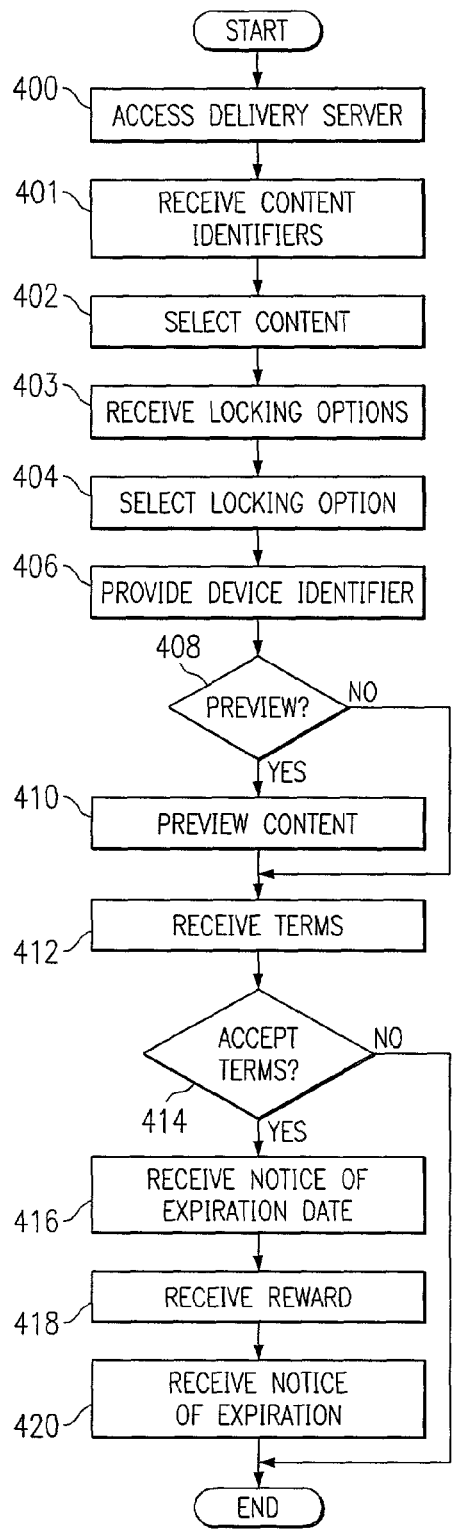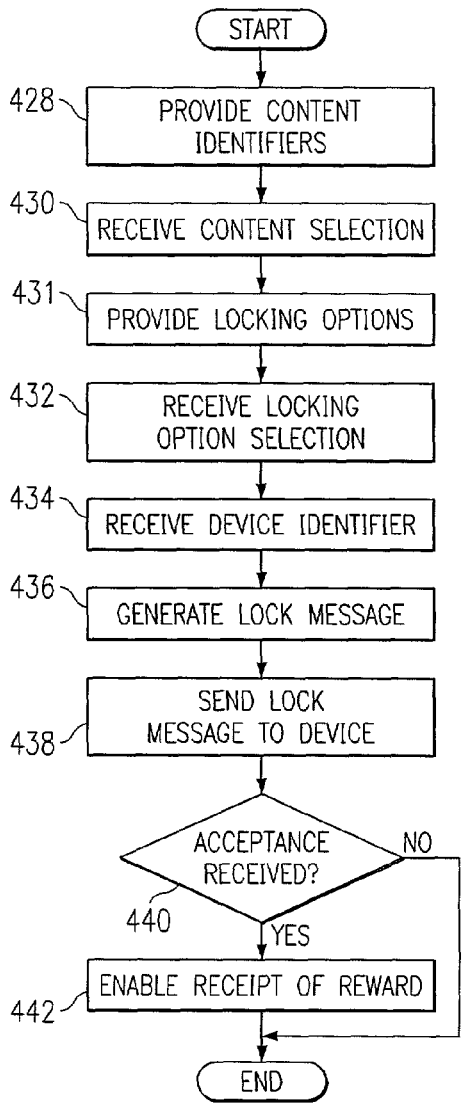

US 7,953,665 B2

METHOD AND SYSTEM FOR DELIVERING CONTENT TO AND LOCKING CONTENT IN A USER DEVICE

TECHNICAL FIELD OF THE INVENTION

The present invention relates generally to communication systems and, more particularly, to a method and system for delivering content to and locking content in a user device.

BACKGROUND OF THE INVENTION

Many types of communication systems have been developed and implemented to effectuate communication of data between two or more sending and receiving stations. In some communication systems, the communication channel interconnecting the sending and receiving stations is formed of a radio channel defined upon a portion of the electromagnetic spectrum. A communication system utilizing radio channels is referred to as a radio communication system.

A cellular communication system is a type of radio communication system which has achieved wide levels of usage and has been installed throughout large geographical areas of the world. Advancements in communication technologies have permitted the development of successive generations of cellular communication systems.

Customization of ringing sounds, or ring tunes, has become popular for users of cellular and other mobile telephones due to the ease of changing the ring tune and the desire for individualization. Businesses can currently provide ring tunes, screen savers, and other similar data to mobile telephones, computers, and the like for promotional or advertising purposes. However, because the users of these devices can easily change the ring tunes or other data after receiving them, the businesses cannot be assured that the desired promotional or advertising goals will be met.

SUMMARY OF THE INVENTION

In accordance with the present invention, a method and system for delivering content to and locking content in a user device are provided that substantially eliminate or reduce disadvantages and problems associated with conventional systems and methods. In particular, a user of the user device allows the content to be locked for a specified period of time or a specified amount of usage in exchange for a specified reward from a business entity associated with the content.

According to one embodiment of the present invention, a method for delivering content to a user device is provided. The method includes receiving a content selection. A device identifier that is operable to identify a specified user device is received. A lock message is generated based on the content selection. The lock message is sent to the user device identified by the device identifier.

According to another embodiment of the present invention, a method for locking content in a user device is provided. The method includes receiving a lock message. The lock message includes terms of a locking option and content data. The terms of the locking option are provided to a user. Acceptance of the terms of the locking option is received from the user. Content in the user device is revised based on the content data. The content is locked in accordance with a locking requirement. The locking requirement is based on the terms of the locking option.

Technical advantages of one or more embodiments of the present invention include providing an improved method for providing content to a user device. In a particular embodiment, a reward is offered to a user of the user device in exchange for allowing the content to be locked in the user device for a specified period of time or for a specified amount of usage. As a result, a business entity with which the content is associated may be assured that the content will fulfill advertisement, promotional, or other purposes for the business entity for the specified period of time or amount of usage, giving the business entity an incentive to offer the reward.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 is a block diagram illustrating a communication system operable to deliver content to and lock content in user devices in accordance with one embodiment of the present invention;

FIG. 2 is a block diagram illustrating a message for providing content to be locked in the user devices of FIG. 1 in accordance with one embodiment of the present invention;

FIGS. 3A-B are tables illustrating data that may be stored in the user devices of FIG. 1 and that may be revised and locked in accordance with one embodiment of the present invention; and FIGS. 4A-C are flow diagrams illustrating a method for delivering content to and locking content in the user devices of FIG. 1 in accordance with one embodiment of the present invention.

DETAILED DESCRIPTION OF THE DRAWINGS

Figure 4C:
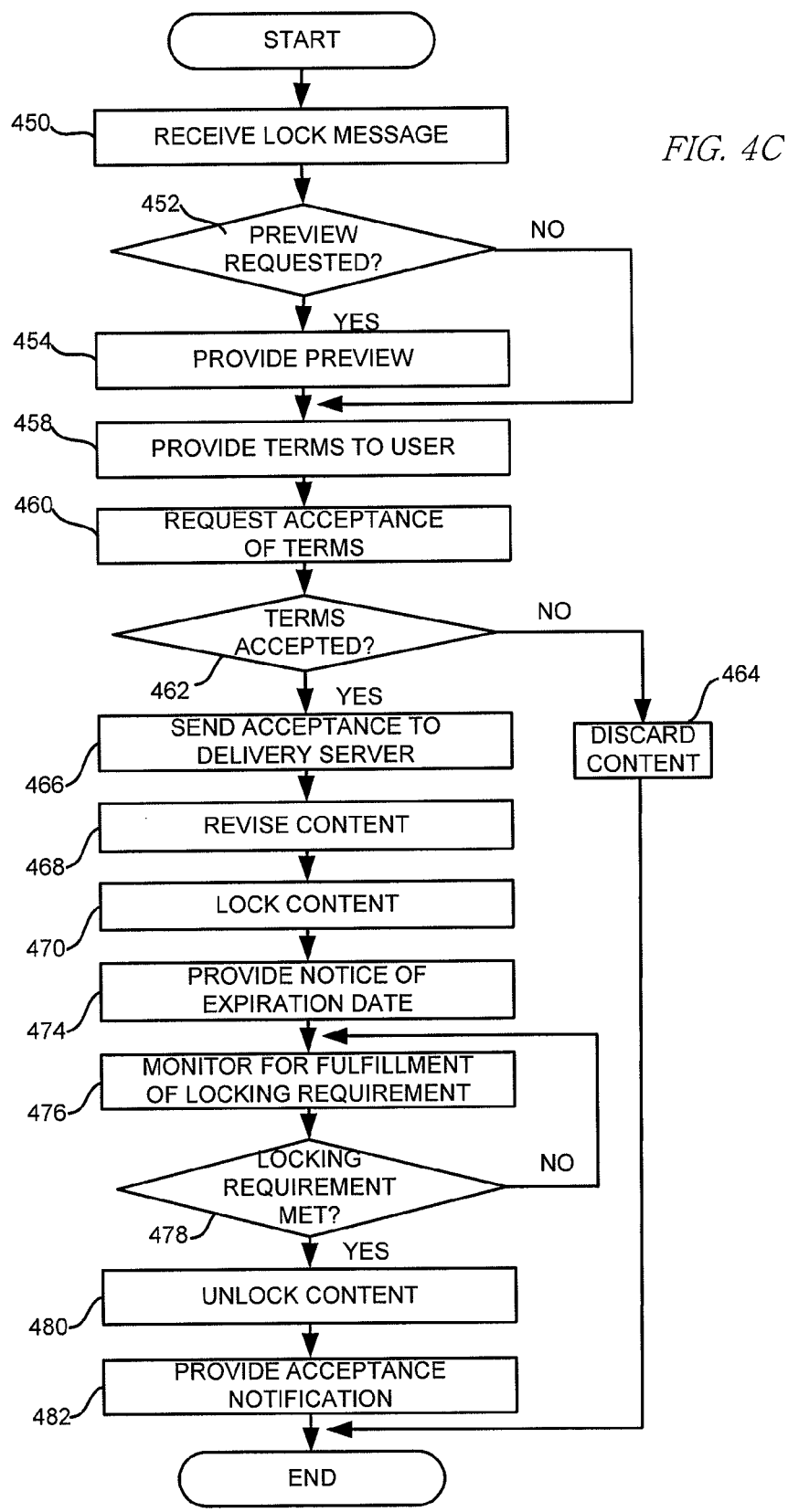

FIG. 1 is a block diagram illustrating a communication system 10 operable to deliver content to and lock content in user devices 12 in accordance with one embodiment of the present invention. The communication system 10 comprises a plurality of user devices 12, a plurality of network stations 14 for providing communication for wireless user devices 12a located in specified geographical areas, at least one delivery server 16 for delivering content to be locked in the user devices 12, and a network 18 for providing communication between non-wireless user devices 12b, network stations 14, and a plurality of servers, including the delivery server 16. It will be understood that the system 10 may comprise any other suitable components of a communication system, such as other suitable servers coupled to the network 18, without departing from the scope of the present invention.

Each user device 12 may comprise a cellular or other mobile telephone, a laptop computer, a personal computer, or other suitable device capable of communicating with a network station 14 and/or the network 18. As used herein, "each" means every one of at least a subset of the identified items. Each user device 12 may comprise a wireless user device 12a or a non-wireless user device 12b or may comprise a device operable to communicate as both a wireless and a non-wireless device.

Each wireless user device 12a is operable to communicate with a network station 14 over a wireless interface 22. Thus, the wireless interface 22 is operable to transfer messages between a wireless user device 12a and a network station 14. The wireless interface 22 may comprise communication channels defined upon radio links, such as an Enhanced Data for GSM (Global System for Mobile communications) Evolution interface, a Wideband Code Division Multiple Access interface, or any other suitable interface.

Each user device 12 comprises a content manager 24 and content data 26 (not shown in user device 12b). The content manager 24 is operable to manage the content data 26. For example, as described in more detail below, the content manager 24 is operable to revise, lock and unlock content data 26. The content data 26 comprises one or more contents for the user device 12. As used herein, "content" means video data, audio data, and/or other suitable data that is operable to be executed, displayed, or otherwise operated on a user device 12. For example, contents may include ring tunes for telephones, screen savers for telephones, screen savers for computers, and the like.

Each network station 14 is operable to provide wireless user devices 12a with access to voice and/or data networks by providing voice and/or data messages received from the wireless user devices 12a to the network 18 and messages received from the network 18 to the wireless user devices 12a. According to one embodiment, the network stations 14 comprise base stations for a public land mobile network and the wireless user devices 12a comprise mobile telephones.

The delivery server 16 is coupled to the network 18 and is operable to deliver content to be locked in the user devices 12. The delivery server 16 comprises a content database 28 that is operable to store a plurality of contents that may be delivered to and locked in the user devices 12. As described in more detail below in connection with FIGS. 4A-C, the delivery server 16 is operable to provide one or more of the contents stored in the content database 28 to the user devices 12 through the network 18. The system 10 may comprise a single delivery server 16 that is operable to provide contents for a plurality of business entities or a plurality of delivery servers 16, each of which may be operable to provide contents for one or more business entities.

In one embodiment, the network 18 comprises a packet data network, such as the Internet, or other suitable network. However, the network 18 may also comprise any interconnection found on any computer network such as a local area network (LAN), a wide area network (WAN), or any other communications and data exchange systems created by connecting two or more computers.

Each non-wireless user device 12b, each network station 14, and the delivery server 16 are operable to communicate with the network 18 over communication lines 34, which may be any type of communication link capable of supporting data transfer. In one embodiment, the communication lines 34 may comprise, alone or in combination, Integrated Services Digital Network (ISDN), Asymmetric Digital Subscriber Line (ADSL), T1 or T3 communication lines, hardwire lines, or telephone links. It will be understood that the communication lines 34 may comprise other suitable types of data communication links. The communication lines 34 may also connect to a plurality of intermediate servers between the network 18 and the non-wireless user devices 12b, the network stations 14, and the delivery server 16.

In operation according to one embodiment, a user of a user device 12 accesses the delivery server 16 through the network 18. The user may access the network 18 through the user device 12 that is to receive the new content from the content database 28 or from any other suitable device that is operable to communicate with the delivery server 16 through the network 18. The delivery server 16 then presents a plurality of content identifiers, each of which is operable to identify a content stored in the content database 28, for selection by the user. The delivery server 16 may also provide any suitable features, such as the ability to search the contents in the content database 28 based on keywords, subject matter, and/or any other suitable searching options.

After the user selects a particular content, the delivery server 16 may present one or more locking options to the user. Each locking option comprises a set of terms, which includes a specified locking requirement and a corresponding reward. For example, for a movie studio desiring to promote a movie, a first locking option may provide a reward of a coupon for free popcorn in exchange for allowing the content (which may be the movie's theme song as a telephone ring tune) to be locked in the user device 12 for a period of two weeks, and a second locking option may provide a reward of a free movie ticket in exchange for allowing the content to be locked in the user device 12 for a period of six weeks. In addition to a specified period of time, the locking requirement may also comprise a specified amount of usage time for the user device 12, a specified number of usages of the content, or any other suitable requirement.

After the user selects a locking option, the user may provide a device identifier to identify the user device 12 in which the content will be locked. For example, the user may provide a telephone number associated with a user device 12 that comprises a mobile telephone. Alternatively, for the situation in which the user is accessing the delivery server 16 through the user device 12 in which the content is to be locked, the delivery server 16 may receive the device identifier from the user device 12 itself.

When the user device 12 is powered on and available to receive data, the delivery server 16 provides the selected content from the content database 28 to the user device 12, along with the terms of the selected locking option. Alternatively, the delivery server 16 may provide one or more locking options for selection by the user at the user device 12 if the locking options were not previously presented to the user. The user device 12 then presents the user with the option to preview the content before accepting the terms. The user may then decide to either accept or reject the terms. If the terms are rejected, the user device 12 may or may not discard the content; however, the user will not receive a reward for using the content in this situation.

On the other hand, if the terms are accepted, the user device 12 provides notification of the acceptance to the delivery server 16 through the network 18, allowing the user to receive the reward. The content manager 24 of the user device 12 also revises the content in the content data 26 and locks the content data 26 in accordance with a locking requirement associated with the selected locking option. For a locking requirement that comprises a specified period of time, the user device 12 notifies the user of the date on which the content will be unlocked. The content manager 24 then determines when the locking requirement has been met, after which the content data 26 is unlocked.

FIG. 2 is a block diagram illustrating a message 200 for providing content to be locked in the user devices 12 in accordance with one embodiment of the present invention. The message 200 may be included in header fields for Short Message Service (SMS) messages, Wireless Application Protocol (WAP) messages, or messages of other suitable formats that are operable to be communicated within the system 10, or the message 200 may be communicated in any other suitable manner.

According to one embodiment, the message 200 comprises a message type field 202, a content type field 204, a content data field 206, a terms field 208, and a forward indicator 210. It will be understood that the message 200 may comprise any other suitable fields for providing additional data about the content or may comprise fewer fields without departing from the scope of the present invention.

The message type field 202 is operable to identify the type of message that is being provided in the message 200. For example, the message types identified by the message type field 202 may include a lock message that comprises content to be locked in a user device 12, an override message that is operable to unlock content that was erroneously locked, and any other suitable type of message.

The content type field 204 is operable to identify the type of content that is being provided in the message 200. For example, the content types identified by the content type field 204 may include a ring tune for a telephone, a screensaver for a telephone, a screensaver for a computer, and any other suitable type of content.

In the case of a lock message, the content data field 206 is operable to provide the actual data to be stored and locked in the content data 26 of the user device 12. In the case of an override message, the content data field 206 may comprise a password to enable the unlocking of the erroneously locked content. According to one embodiment, the password may be based on the locked content data 26 and/or a device identifier for the user device 12. However, it will be understood that the password may be otherwise suitably determined without departing from the scope of the present invention.

In the case of a lock message, the terms field 208 is operable to provide a locking requirement, which may comprise one of a specified period of time, a specified amount of usage time, or a specified number of usages for which the content data 26 provided in the content data field 206 will be locked in the user device 12. In addition, the terms field 208 is operable to provide data relating to the reward offered in exchange for locking the content data 26 until the locking requirement is met. The terms field 208, or any other suitable field, may also comprise a password to allow the content to be unlocked with an override message. Thus, in this embodiment, the password received in an override message may be compared to the password previously received in the lock message in order to validate the override message. In the case of an override message, the terms field 208 may comprise a value of zero or any other suitable data.

In the case of a lock message, the forward indicator 210 is operable to enable the user device 12 to forward the content data 26 in the content data field 206 to other user devices 12. For example, the forward indicator 210 may comprise a value of one to indicate that the content data 26 is forwardable and a value of zero to indicate that the content data 26 is not forwardable, or vice versa. In the case of an override message, the forward indicator 210 may comprise a value to indicate that the data is not forwardable or any other suitable data.

FIGS. 3A-B are tables illustrating data that may be stored in the user devices 12 and that may be revised and locked along with the content data 26 in accordance with one embodiment of the present invention. For the illustrated embodiment, the user device 12 in which the data is stored comprises a telephone; however, it will be understood that similar data may be stored in a user device 12 other than a telephone. Although the data is illustrated as being stored in tables, it will be understood that the data may be otherwise suitably stored without departing from the scope of the present invention.

FIG. 3A illustrates a profile table 300 that is operable to store profile data. According to one embodiment, the profile data comprises a profile identifier 302, a tune/vibrate indicator 304, a tune identifier 306, and a volume level 308. It will be understood that the profile data may comprise any other suitable information without departing from the scope of the present invention.

Profile table 300a illustrates profile data in a user device 12 when the content data 26 is unlocked, and profile table 300b illustrates profile data in a user device 12 when the content data 26 is locked. In the illustrated embodiment, profile table 300a comprises a plurality of profiles with corresponding profile identifiers 302, such as a standard profile, an outdoor profile, and a meeting profile. It will be understood that any suitable profiles may be stored in profile table 300a without departing from the scope of the present invention. In addition, the profile identifiers 302 may be stored in any suitable format. For example, the profile identifiers 302 may comprise numerical values or any other suitable identifiers.

Each profile has a corresponding tune/vibrate indicator 304 that is operable to indicate whether the telephone will play an audible tune or will vibrate when the telephone is in the corresponding profile and receives an incoming call. For example, the meeting profile in the illustrated embodiment includes a vibrate indicator 304 to indicate that the telephone will vibrate when receiving an incoming call and, thus, will not interrupt a meeting. In addition, the tune/vibrate indicators 304 may be stored in any suitable format. For example, the tune/vibrate indicators 304 may comprise numerical values or any other suitable indicators.

Each profile also has a corresponding tune identifier 306 that is operable to identify a tune to be played when the telephone is in the corresponding profile and receives an incoming call. The tune identifier 306 may also be operable to indicate that the tune to be played comprises locked content data 26. For this embodiment, the content data 26 may comprise a single content or may comprise a plurality of contents with a particular one of the contents identifiable as locked content. In this situation, the tune identifier 306 may comprise a specified value that identifies the tune to be played as the locked content data 26. In addition, the tune identifiers 306 may be stored in any suitable format. For example, the tune identifiers 306 may comprise alphanumeric character strings, such as tune names, or any other suitable identifiers. When the profile includes a vibrate indicator 304 as opposed to a tune indicator 304, the tune identifier 306 may comprise a value of zero or other suitable data. Alternatively, the tune identifier 306 may comprise no data when the profile includes a vibrate indicator 304.

Each profile also has a corresponding volume level 308 to indicate how loudly the tune identified by the tune identifier 306 is to be played by the telephone when the telephone is in the corresponding profile and receives an incoming call. In addition, the volume level 308 may be stored in any suitable format. For example, the volume level 308 may comprise alphanumeric character strings, such as "high," "low," and the like, or any other suitable identifiers. As with the tune identifier 306, the volume level 308 may comprise a value of zero or other suitable data, or no data at all, when the profile includes a vibrate indicator 304.

When the content data 26 is revised and locked in accordance with the method of FIGS. 4A-C described below, profile table 300a is revised into profile table 300b. Thus, according to one embodiment, the profile data remains unchanged with the exception of the tune identifiers 306 corresponding to profiles with tune indicators 304. These tune identifiers 306 are revised to identify the content data 26 that is locked in the user device 12. In addition, after the locking requirement for the locking of the content data 26 has been met, profile table 300b is revised back to profile table 300a. Alternatively, profile table 300b may remain unchanged, while the content manager 24 allows the tune identifiers 306 to be revised manually by the user of the user device 12.

In an alternative embodiment, the profile data and, thus, the profile table 300 may comprise a lock indicator to indicate whether or not the content data 26 identified by the corresponding tune identifier 306 is locked. In this embodiment, the profile data would remain unchanged between profile table 300a and profile table 300b with the exceptions of the tune identifier 306, which would specifically identify the locked content data 26, and the lock indicator, which would indicate "unlocked" in profile table 300a and "locked" in profile table 300b. In this situation, the content data 26 may comprise a single content or may comprise a plurality of contents without needing to have a particular one of the contents identifiable as locked content.

FIG. 3B illustrates a caller table 320 that is operable to store caller identification data. According to one embodiment, the caller identification data comprises a caller identifier 322, a tune identifier 324, and an optional volume level 326. It will be understood that the caller identification data may comprise any other suitable information without departing from the scope of the present invention.

Caller table 320a illustrates caller identification data in a user device 12 when the content data 26 is unlocked, and caller table 320b illustrates caller identification data in a user device 12 when the content data 26 is locked. In the illustrated embodiment, caller table 320a comprises a plurality of caller identification records with corresponding caller identifiers 322, including "Nick," "Mom," and "Julie." It will be understood that any suitable caller identification records may be stored in caller table 320a without departing from the scope of the present invention. In addition, the caller identifiers 322 may be stored in any suitable format. For example, the caller identifiers 322 may comprise numerical values, such as telephone numbers, or any other suitable identifiers.

Each caller identification record has a corresponding tune identifier 324 that is operable to identify a tune to be played when the telephone receives an incoming call from the caller identified by the caller identifier 322. The tune identifier 324 may also be operable to indicate that the tune to be played comprises locked content data 26. For this embodiment, the content data 26 may comprise a single content or may comprise a plurality of contents with a particular one of the contents identifiable as locked content. In this situation, the tune identifier 324 may comprise a specified value that identifies the tune to be played as the locked content data 26. In addition, the tune identifiers 324 may be stored in any suitable format. For example, the tune identifiers 324 may comprise alphanumeric character strings, such as tune names, or any other suitable identifiers.

Each caller identification record may optionally have a corresponding volume level 326 to indicate how loudly the tune identified by the tune identifier 324 is to be played by the telephone when the telephone receives an incoming call from the caller identified by the caller identifier 322. In addition, the volume level 326 may be stored in any suitable format. For example, the volume level 326 may comprise alphanumeric character strings, such as "high," "low," and the like, or any other suitable identifiers.

When the content data 26 is revised and locked in accordance with the method of FIGS. 4A-C described below, caller table 320a is revised into caller table 320b. Thus, according to one embodiment, the caller identification data remains unchanged with the exception of the tune identifiers 324, which are revised to identify the content data 26 that is locked in the user device 12. In addition, after the locking requirement for the locking of the content data 26 has been met, caller table 320b is revised back to caller table 320a. Alternatively, caller table 320b may remain unchanged, while the content manager 24 allows the tune identifiers 324 to be revised manually by the user of the user device 12.

In an alternative embodiment, the caller identification data and, thus, the caller table 320 may comprise a lock indicator to indicate whether or not the content data 26 identified by the corresponding tune identifier 324 is locked. In this embodiment, the caller identification data would remain unchanged between caller table 320a and caller table 320b with the exceptions of the tune identifier 324, which would identify the locked content data 26, and the lock indicator, which would indicate "unlocked" in caller table 320a and "locked" in caller table 320b. In this situation, the content data 26 may comprise a single content or may comprise a plurality of contents without needing to have a particular one of the contents identifiable as locked content.

FIGS. 4A-C are flow diagrams illustrating a method for delivering content to and locking content in the user devices 12 in accordance with one embodiment of the present invention. FIG. 4A illustrates the method from the perspective of a user of the user device 12, FIG. 4B illustrates the method from the perspective of the delivery server 16, and FIG. 4C illustrates the method from the perspective of the user device 12.

The method of FIG. 4A begins at step 400 where a user accesses the delivery server 16 through the network 18. The user may access the network 18 through the user device 12 in which content is to be locked or through any other device operable to communicate with the network 18. At step 401, the user receives a plurality of content identifiers for selection. At step 402, the user selects the content to be stored and locked in the user device 12.

At step 403, the user may receive one or more locking options for selection. At step 404, the user may select a locking option for the content. At step 406, the user or the user device 12 provides a device identifier for the user device 12 in which the content is to be locked. For example, the device identifier may comprise a telephone number for a user device 12 that comprises a telephone.

At decisional step 408, the user decides whether or not to preview the content in the user device 12. If the user decides to preview the content, the method follows the Yes branch from decisional step 408 to step 410. At step 410, the user previews the content. For example, when the content comprises a ring tune, the user device 12 may play the ring tune for the user.

Returning to decisional step 408, if the user decides not to preview the content, the method follows the No branch from decisional step 408 to step 412. Also, from step 410, the method continues to step 412. At step 412, the user receives the terms associated with the locking option selected in step 404. Thus, for example, the user device 12 may display the offered reward and corresponding locking requirement to the user. In an alternative embodiment, the user may receive one or more locking options for selection and may select a locking option for the content at the user device 12. In this case, the user device 12 may receive the terms associated with the one or more locking options available for selection.

At decisional step 414, the user decides whether or not to accept the terms. If the user decides not to accept the terms, the method follows the No branch from decisional step 414 and comes to an end. However, if the user decides to accept the terms, the method follows the Yes branch from decisional step 414 to step 416. According to one embodiment, if the user attempts to accept terms when another content has been locked in the user device 12, the attempt will be rejected and the method will come to an end. It will be understood that the method may be otherwise terminated in the event that content is currently locked in the user device 12.

At step 416, the user may receive a notice of the expiration date for the locked content when the locking requirement comprises a specified period of time. Thus, for example, the user device 12 may display a particular date and/or time after which the content will be unlocked. At step 418, the user may receive the reward as defined in the terms accepted by the user. At step 420, after the locking requirement has been met, the user receives a notice of expiration indicating that the content has been unlocked, at which point the method comes to an end.

The method of FIG. 4B begins at step 428 where the delivery server 16 provides content identifiers to the user for selection. At step 430, the delivery server 16 receives a content selection from the user. At step 431, the delivery server 16 may provide one or more locking options to the user for selection. At step 432, the delivery server 16 may receive a locking option selection from the user. At step 434, the delivery server 16 receives a device identifier from the user or from the user device 12. If the delivery server 16 is to receive the device identifier from the user, the delivery server 16 may send a request for the device identifier to the user.

At step 436, the delivery server 16 generates a lock message for the user device 12 identified by the device identifier received in step 434. The lock message comprises the content associated with the content selection received in step 430 and the terms associated with the locking option selection received in step 432. In an alternative embodiment, the lock message comprises terms associated with one or more locking options available for selection by the user at the user device 12. At step 438, the delivery server 16 sends the lock message to the user device 12 through the network 18.

At decisional step 440, the delivery server 16 determines whether or not an acceptance of the terms has been received from the user device 12. If no acceptance has been received after a pre-defined amount of time, the method follows the No branch from decisional step 440 and comes to an end. However, if an acceptance has been received, the method follows the Yes branch from decisional step 440 to step 442. At step 442, the delivery server 16 enables receipt of the reward specified in the terms of the locking option for the user, at which point the method comes to an end.

The method of FIG. 4C begins at step 450 where the user device 12 receives a lock message from the delivery server 16 through the network 18. The lock message comprises a content from the content database 28 and terms associated with a selected locking option or, alternatively, with one or more locking options available for selection. At decisional step 452, the user device 12 determines whether or not the user has requested a preview of the content. If the user has requested a preview of the content, the method follows the Yes branch from decisional step 452 to step 454. At step 454, the user device 12 provides a preview of the content for the user.

Returning to decisional step 452, if the user device 12 determines that the user has not requested a preview of the content, the method follows the No branch from decisional step 452 to step 458. Also, from step 454, the method continues to step 458. At step 458, the user device 12 provides the terms of the selected locking option to the user. For example, the user device 12 may display the terms to the user on a display of the user device 12. For the embodiment in which the lock message comprises terms associated with one or more locking options available for selection, the user device 12 provides the locking options for selection and receives a selection of a locking option from the user. At step 460, the user device 12 requests that the user accept the terms of the locking option selected by the user.

At decisional step 462, the user device 12 makes a determination regarding whether or not the user has accepted the terms. If the user has not accepted the terms, the method follows the No branch from decisional step 462 to step 464. At step 464, the user device 12 may discard the content received from the delivery server 16, at which point the method comes to an end.

Returning to decisional step 462, if the user device 12 determines that the user has accepted the terms, the method follows the Yes branch from decisional step 462 to step 466. According to one embodiment, if the user attempts to accept terms when another content has been locked in the user device 12, the user device 12 will reject the attempt and the method will come to an end. It will be understood that the method may be otherwise terminated in the event that content is currently locked in the user device 12. At step 466, the user device 12 sends an acceptance notification to the delivery server 16 to indicate that the user has accepted the terms, allowing the user to receive the reward. For the embodiment in which the locking option is selected by the user at the user device 12, the acceptance notification may comprise the terms associated with the selected locking option.

At step 468, the content manager 24 of the user device 12 revises the content in accordance with the terms of the locking option. For example, the content manager 24 may revise profile tables 300 and/or caller tables 320, as described above in connection with FIGS. 3A-B. At step 470, the content manager 24 locks the content such that the user may not revise the content until the specified locking requirement has been met.

At step 474, the user device 12 may provide notice of the expiration date to the user when the locking requirement comprises a specified period of time. At step 476, the user device 12 monitors for the fulfillment of the locking requirement. Thus, the user device 12 may monitor for the passage of a specified period of time, for the passage of a specified amount of usage time for the user device 12, for a specified number of usages of the content, or other suitable locking requirement.

At decisional step 478, the user device 12 makes a determination regarding whether or not the locking requirement has been met. If the locking requirement has not been met, the method follows the No branch from decisional step 478 and returns to step 476 to continue monitoring. However, if the user device 12 determines that the locking requirement has been met, the method follows the Yes branch from decisional step 478 to step 480. At step 480, the content manager 24 of the user device 12 unlocks the content, allowing the user to revise the content. At step 482, the user device 12 provides a notice of expiration to the user, at which point the method comes to an end.

Thus, in accordance with the method of FIGS. 4A-C, a user of a user device 12 is offered a reward in exchange for allowing a content associated with a business entity to be locked in the user device 12 for a specified period of time or a specified amount of usage. When the user accepts the terms, the business entity is assured that the content will fulfill its promotional or advertising goals for the specified period of time of the specified amount of usage.

Although the present invention has been described with several embodiments, various changes and modifications may be suggested to one skilled in the art. It is intended that the present invention encompass such changes and modifications as fall within the scope of the appended claims.

What is claimed is:

1. An apparatus comprising:
a content manager configured to cause the apparatus to at least:
cause transmission of an indication of a selected content to a network based device, the selected content being selected from a plurality of content stored at the network based device;
cause presentment of one or more received locking options for the selected content;
determine a selection of a locking option from the one or more locking options, the selected locking option comprising a first selected locking requirement;
cause transmission of a device identifier of the apparatus;
in response to receipt of the selected content to the apparatus, selectably locking the selected content pursuant to the first selected locking requirement, wherein the selected content is presented upon each occurrence of a predefined condition associated with the selected content until the first selected locking requirement is met;
determine when the first selected locking requirement is met; and
unlock the selected content in an instance in which the first selected locking requirement is determined to have been met, wherein the selected content is no longer required to be presented upon an occurrence of the predefined condition.

2. The apparatus of claim 1, wherein the content manager is further configured to cause the apparatus to receive an indication of a reward in response to the first selected locking requirement being met.

3. The apparatus of claim 1, wherein the selected content comprises advertising content, and wherein the advertising content is caused to be displayed upon each occurrence of the predefined condition associated with the selected content until the first selected locking requirement is met.

4. The apparatus of claim 1, wherein the selected content comprises a ring tune advertisement and the predefined condition comprises receipt of an incoming call, and wherein the ring tune advertisement is presented upon each receipt of an incoming call until the first selected locking requirement is met.

5. A method comprising:
receiving, at a network based device, an indication of selected content;
causing, by the network based device, presentment of at least a first locking requirement associated with the selected content to a user device wherein said locking requirement defines a specific period of time or a specified amount of usage for which the content is locked in at the user device and required to be presented;
determining, by the network based device, a selection of the at least a first locking requirement;
receiving, at the network based device, a device identifier of the user device;
causing, based at least in part on the received device identifier, the selected content to be provided by the network based device to the user device together with the at least first selected locking requirement to permit the selected content to be presented by the user device upon each occurrence of a predefined condition associated with the selected content until the at least the first selected locking requirement is met;
receiving, at the user device, the selected content;
in response to receipt of the selected content to the apparatus, selectably locking the selected content pursuant to the first selected locking requirement, wherein the selected content is presented by a content manager of the user device upon each occurrence of a predefined condition associated with the selected content until the first selected locking requirement is met;
determining, by the content manager of the user device, when the first selected locking requirement is met; and
unlocking, by the content manager of the user device, the selected content in an instance in which the first selected locking requirement is determined to have been met, wherein the selected content is no longer required to be presented upon an occurrence of the predefined condition.

6. The method of claim 5 further comprising:
receiving an indication of said at least first selected locking requirement having been met.

7. The method as in claim 6 further comprising:
causing a reward to be provided in response to said indication.

8. A method comprising:
causing transmission of an indication of selected content;
receiving at least a first locking requirement associated with the selected content at a user device, wherein said locking requirement defines a specific period of time or a specified amount of usage for which the content is locked in the user device and required to be presented;
determining, by a content manager of the user device, selection of the at least the first selected locking requirement;
causing transmission of a device identifier of the user device to a network based device;
receiving said selected content;
causing storage of said selected content in a memory of the user device;
causing, by the content manager of the user device, presentment of the selected content by the user device upon each occurrence of a predefined condition associated with the selected content until the at least the first selected locking requirement is met;
determining when the at least the first selected locking requirement is met; and
unlocking the selected content data in response to determining that the first selected locking requirement has been met.

9. A method as in claim 8 further comprising:
receiving an indication of a reward.

10. The method of claim 8, wherein the selected content comprises a ring tune advertisement and wherein causing presentment of the selected content by the user device upon each occurrence of a predefined condition associated with the selected content comprises causing presentment by the user device of the selected ring tune advertisement upon each receipt of an incoming call.

11. The method of claim 8, wherein the selected content comprises advertising content, and wherein causing presentment of the selected content comprises causing the advertising content to be displayed on a display of the user device upon each occurrence of the predefined condition associated with the selected content until the at least the first selected locking requirement is met.

12. The method of claim 8, wherein the selected content comprises a ring tune advertisement and the predefined condition comprises receipt of an incoming call, and wherein causing presentment of the selected content comprises causing the ring tune advertisement to be presented upon each receipt of an incoming call until the at least the first selected locking requirement is met.

13. An apparatus comprising:
a content manager configured to cause the apparatus to:
cause transmission of an indication of a selected content to a network based device, the selected content being selected from a plurality of content stored at the network based device;
cause presentment of one or more received locking options for the selected content;
determine a selection of a locking option from the one or more locking options, the selected locking option comprising a first selected locking requirement;
cause transmission of a device identifier of the apparatus;
receive the selected content; and
lock in said selected content pursuant to the first locking requirement, wherein the selected content is presented upon each occurrence of a predefined condition associated with the selected content until the first locking requirement is met; and
a memory configured to store a plurality of profiles wherein each profile comprises an identifier indicative of the use of said locked selected content.

14. The apparatus of claim 13, wherein the content manager is further configured to cause the apparatus to receive an indication of a reward in response to the first locking requirement being met.

15. The apparatus of claim 13, wherein the selected content comprises advertising content, and wherein the advertising content is caused to be displayed upon each occurrence of the predefined condition associated with the selected content until the first locking requirement is met.

16. The apparatus of claim 13, wherein the selected content comprises a ring tune advertisement and the predefined condition comprises receipt of an incoming call, and wherein the ring tune advertisement is presented upon each receipt of an incoming call until the first locking requirement is met.

17. A method comprising:
causing transmission of an indication of a selected content to a network based device, the selected content being selected from a plurality of content stored at the network based device;
receiving at least one locking requirement including a first locking requirement associated with the selected content;
determining, by a content manager of a user device, selection of at least the first locking;
causing transmission of a device identifier of the user device;
receiving said selected content;
causing storage of said selected content in a memory the user device;
operating, by the content manager of the user device, upon the selected content in accordance with the at least the first selected locking requirement by causing presentment of the selected content by the user device upon each occurrence of a predefined condition associated with the selected content until the at least the first selected locking requirement is met;
determining when the first selected locking requirement is met;
causing notification of the network based device or a second network based device when the first selected locking requirement is met; and
causing a reward to be provided to a user.

18. The method of claim 17 further comprising unlocking, when the first selected locking requirement is met, the selected content data to release the selected content out of the first selected locking requirement.

19. The method of claim 17 wherein the selected content of the plurality of content comprises advertising content and wherein said method further comprises the operation of displaying the advertising content according to the at least the first selected locking requirement.

20. The method of claim 19 wherein the at least the first selected locking requirement defines a manner by which to display the advertising content in human perceptible form.

* * * * *